United States Patent [19]
Parzych et al.

[11] Patent Number: 5,375,243
[45] Date of Patent: Dec. 20, 1994

[54] HARD DISK PASSWORD SECURITY SYSTEM

[75] Inventors: James D. Parzych; Richard Tomaszewski, both of Houston; Norman P. Brown; Roger P. Anderson, both of Tomball; David M. Douglas, Houston; Kenneth W. Stufflebeam, Spring, all of Tex.

[73] Assignee: Compaq Computer Corporation, Houston, Tex.

[21] Appl. No.: 208,052

[22] Filed: Mar. 7, 1994

Related U.S. Application Data

[63] Continuation of Ser. No. 772,695, Oct. 7, 1991, abandoned.

[51] Int. Cl.$^5$ ............... G06F 12/00; H04L 9/32
[52] U.S. Cl. ............... 395/725; 380/4; 380/52; 380/25; 380/50; 395/575; 395/425; 364/222.5; 364/286.4; 364/286.5; 364/969.2; 364/969.4; 364/918.7; 364/DIG. 1
[58] Field of Search ............ 395/425, 575, 725; 380/4, 23, 25, 50, 52; 340/825.31, 825.34

[56] References Cited

U.S. PATENT DOCUMENTS

| | | | |
|---|---|---|---|
| 3,890,601 | 6/1975 | Pietrolewicz | 364/DIG. 1 |
| 4,942,606 | 7/1990 | Kaiser et al. | 380/4 |
| 4,959,860 | 9/1990 | Watters et al. | 380/4 |
| 5,012,514 | 4/1991 | Renton | 380/4 |
| 5,097,506 | 3/1992 | Kaiser, Jr. et al. | 380/25 |
| 5,173,940 | 12/1992 | Lantz et al. | 380/25 |

OTHER PUBLICATIONS

Disklock Advertisement, PC Magazine, vol. 10, No. 11, Jun. 11, 1991; New York, New York; p. 139.
Fastlock User's Manual, Version 1.0, Rupp Corp., New York, New York.

*Primary Examiner*—Eddie P. Chan
*Attorney, Agent, or Firm*—Pravel, Hewitt, Kimball & Krieger

[57] ABSTRACT

A hard drive which prevents data access operations on the hard drive upon power up until the user enters a password. When the computer system is powered up, the hard drive spins up and is tested, responding only to a limited set of commands that do not permit data storage or retrieval operations. The password is located on the hard disk itself to prevent bypassing the hard drive's security using a new computer environment. When the user enters the correct password, the hard drive unlocks and operates as a conventional hard drive. If the user chooses, the hard drive may be unlocked by either of two passwords, one defined by the user and the other by the manufacturer. To obtain access to data areas during a locked state, a wipe data command is provided which overwrites all user data on the drive and unlocks the drive.

18 Claims, 6 Drawing Sheets

HARD DISK PASSWORD SECURITY SYSTEM

This is a continuation of co-pending application Ser. No. 07/772,695 filed on Oct. 7, 1991 now abandoned.

BACKGROUND OF THE INVENTION

1. Field of the Invention

The invention generally relates to hard drives used with computer systems and more particularly to a method and apparatus for preventing access to the hard drive until a password is entered.

2. Description of the Related Art

The rising popularity of portable computers has corresponded to the extraordinary improvements in the field, as portable computer systems rapidly develop the capabilities and characteristics of desktop models. For example, LCD displays for portable computers have become more sophisticated and readable. Many portables now include floppy disk drives to allow improved versatility and capacity. Furthermore, hard disk units are becoming common, offering greater speed and capacity than floppy drives.

The integration of hard drives into portable computers provides the user with much greater memory than floppy disk drives. Hard drives offer considerably shorter access times to data and programs. Consequently, the information that is most important to the user is commonly stored on the hard drive where the user has ready access. Information on the hard disk, therefore, may be extremely confidential and valuable, and must be protected. Ordinarily, access to the system as a whole is protected by a password program that restricts access to those that enter a password.

Password programs commonly employ a power-on password stored in the computer's CMOS memory. When the computer system initially powers up and completes the self-test operations, the computer executes a power-on password program. The password is read from the CMOS and compared to the password entered by the user on the keyboard to determine whether the correct password has been given. If so, the user is allowed access to the system. If not, the system remains inaccessible until the correct password is entered. Many systems allow only a few attempts at entering a password, after which the system must be turned off and powered up again to make another attempt.

For conventional desktop models, password programs generally provide sufficient defense to unauthorized access. For portable computers, however, power-on password protection may not be enough. Unlike their desktop counterparts, portable computers are easily stolen. A portable computer may be equipped with power-on password protection, which will prevent unauthorized access to the information on the hard disk unit through the computer system, but the hard drive unit may be physically removed from the computer and installed in another system. Because the new system does not employ password protection, the hard drive becomes accessible to an unauthorized user, and the data vulnerable to theft and misuse.

To prevent unauthorized access of this sort, the data may be encrypted before it is placed on the hard disk. Encryption involves altering the standard data code into a secret code, which must be decoded when it is retrieved from memory before the data can be used. An unauthorized user may thus put the drive in another computer to gain access to the code on the hard disk, but the data will be meaningless if it is not decoded. Encryption, however, requires support hardware and software in the computer system to encode and decode the data. Encryption also reduces the computer system's performance due to the delay while the encryption mechanism encodes or decodes the data.

SUMMARY OF THE PRESENT INVENTION

The present invention prevents unauthorized access to the hard drive unit by placing an access password on the hard drive itself. When the computer system is powered up, the hard drive unit is in a LOCKED state and demands the password before access is allowed. No access to the hard drive, other than to wipe all of the data from the drive or to check the drive's status, is permitted until the password on the hard disk is entered by the user. If the user attempts to gain access to the drive by removing the drive from the original computer and placing it in another system, the hard drive remains inaccessible. Because the password is located on the hard drive instead of in the system CMOS, the disk will remain LOCKED regardless of the computer system in which it is operating.

In the preferred embodiment, the hard drive contains two passwords. The first: is a user defined password that is established by the usual operation of the computer. The second is a password determined by the manufacturer, stored on the drive after encryption according to an algorithm known only to the manufacturer. Only one of the passwords is required to unlock the system. If the first password is forgotten, the user can contact the manufacturer or authorized facility. After verifying true ownership, the manufacturer or authorized facility uses the serial number of the hard drive to determine the unit's second password and allow the user access. After regaining access, the user may then change the first password to something the user is more likely to remember.

Alternatively, the user may choose to restrict access to the hard drive with only a single password. The password is created by the user and provides the sole means of access to the hard drive. The manufacturer's password is omitted from the drive so that even the manufacturer cannot gain access to the drive unit. If the password is forgotten, however, the user's only option is to wipe all of the data from the unit, thereby losing all of the information stored on the disk. The hard drive is then reset to its UNLOCKED status, and the user can provide a new password for the drive.

Capabilities to activate and deactivate the hard drive password feature are also provided.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
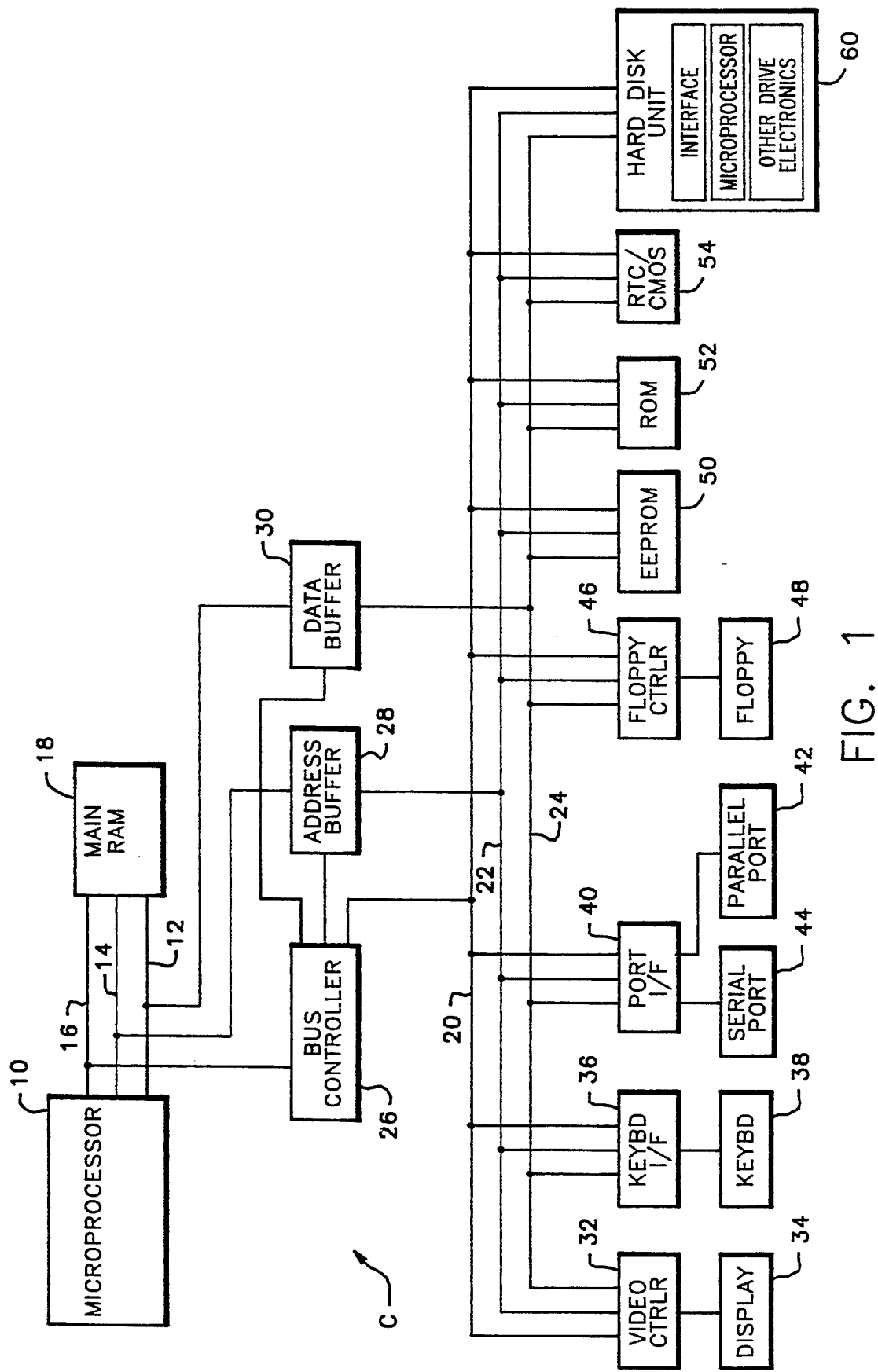
FIG. 1 is a block diagram of a computer incorporating the present invention.

Referring now to FIG. 1, the letter C generally represents a computer incorporating the present invention. A number of different blocks are used in the computer C. This description of the computer C is provided to be exemplary of the environment of the invention and is not intended to be limiting as to the particular arrangement of the illustrated computer C.

The foundation of a computer system C according to the present invention is a microprocessor 10. The microprocessor 10 has a host address bus 12, a host data bus 14, and a host control bus 16. A main memory 18, composed of random access memory (RAM), is connected to each of the host buses 12, 14, 16. The computer system C also includes a system control bus 20, a system address bus 22, and a system data bus 24. The exchange of signals between the system buses 20, 22, 24 and host buses 12, 14, 16 is controlled by a bus controller 26. An address buffer 28 is connected to the host address bus 12 and the system address bus 22, and a data buffer 30 is connected to the host data bus 14 and the system data bus 24. Each buffer 28, 30 is controlled by signals from the bus controller 26.

The system buses 20, 22, 24 are connected to a series of peripheral devices. A video controller 32 is coupled to each of the buses 20, 22, 24, and to communicate information to the user, a display 34 is connected to the video controller 32. In addition, a keyboard interface 36 is connected to the system buses 20, 22, 24. Connected to the keyboard interface 36 is a keyboard 38 to allow the user to enter desired character sequences and commands. Coupled to each of the system buses 20, 22, 24 is a port interface 40, which provides a parallel port 42 and a serial port 44. A floppy disk controller 46 is further connected to each system bus 20, 22, 24. A floppy disk unit 48, used to provide storage for the computer C, is connected to the floppy disk controller 46. An electrically erasable programmable read only memory (EEPROM) 50, connected to each bus 20, 22, 24, retains the extended setup information relating to board configuration, as needed in a system according to the Extended Industry Standard Architecture (EISA) or as needed for other purposes. A read only memory (ROM) 52 includes the necessary basic operating software utilized in a computer system C and is connected to each of the system buses 20, 22, 24. In addition, a real time clock (RTC)/CMOS memory 54 is connected to the system buses 20, 22, 24 to provide constant time of day functions and allow storage of various system constants and values related to the system configuration and options. Finally, a hard disk unit 60 is connected to each bus 20, 22, 24. The hard disk unit 60 includes a hard drive and a controller for regulating access to and from the hard disk. For the storage of particular operating data, the hard disk controller includes a precompensation register. Preferably the hard drive is an IDE or integrated drive electronics unit wherein the drive controller includes a microprocessor and is affixed to the drive and receives commands via a port connected to the buses 20, 22, 24. Operation and conventional commands of an IDE drive are known to those skilled in the art. Alternatively, other hard drives which contain microprocessors, such as SCSI and ESDI drives, may also operate according to the present invention.

Proceeding now to the operation of the hard drive security system, the hard disk password option allows the user to choose one of three levels of security. The user may choose no security at all, in which case the hard disk password is disabled and all hard disk commands are functional. If protection is desired, the user has a choice of two levels of security. LEVEL 1 provides the highest degree of protection to the user, as only one password, up to seven characters defined by the user, is stored on the hard drive. All hard drive commands become functional only after the user defined password is entered following the power-on self-test (POST) procedure. This is the UNLOCKED state. Until the password is entered, the drive remains LOCKED, a non-volatile programmable state in which the drive honors only a limited set of commands, as specified below. All other commands are aborted. No data may be retrieved from the bus interface or any service port. Consequently, only those that know the user defined password have access to the hard drive. If the user forgets the password, however, there is no way for the user to retrieve data. The only way to regain access to the drive is by executing the WIPE DATA command, which writes over all data on the hard drive, as described in more detail below.

For LEVEL 2 security, two passwords unlock the hard drive. The first is the user defined password as described above. The second password is preferably derived from the hard drive's serial number and is encrypted according to a particular algorithm and stored at a second location on the hard drive. Either password unlocks the hard drive. If the user forgets the user defined password, the user can take the drive to the manufacturer or a dealer. After verifying ownership, the dealer contacts the manufacturer and conveys the hard drive's serial number. The manufacturer encrypts a portion of the serial number, such as the last seven non-blank characters, using the same algorithm as that included in the computer. When the encryption is complete, the manufacturer gives the resulting password to the dealer, who then uses the password to unlock the hard drive. After the hard drive has been UNLOCKED, the user defined password can be changed to suit the user.

Thus, the user can enable the hard disk password option by choosing LEVEL 1 or LEVEL 2 security. Either option places the disk unit in a LOCKED state when the hard drive is next power cycled. When power is applied to the system, the system commences its POST or power on, self-test procedure. While POST is running, the POST program tests the hard drive to insure that it is operating, and checks the CMOS memory to be certain that it contains the correct hard disk information. The hard drive unit spins up and becomes ready to operate, but remains in its LOCKED state. When all sub-system tests have been completed, the POST program executes the power-on password code, if it is enabled, followed by the hard disk password code. The screen is cleared and the user is prompted for the hard disk password. Until the password is entered, the drive remains LOCKED, and only a limited set of commands is honored by the drive. All other commands are aborted, allowing no data retrieval from the user sectors, interfaces, or service ports. The set of commands honored by the drive while in the LOCKED state includes, however, those that are required to complete the POST operations. These commands allow the computer system to determine whether the disk drive is operating properly. The commands do not, however, allow any data retrieval from the disk. These commands are the ID, initiate drive parameters, seek, recalibrate, write to the buffer and read verify commands.

While LOCKED, the disk drive particularly responds to three commands. The first is the ID command, which causes the hard drive to provide information and a series of parameters identifying the hard drive's characteristics and status. When the ID command is issued, the response indicates the serial number of the drive, whether the password option is supported on that drive, and whether the drive is LOCKED or UNLOCKED. The ID command must be honored while the drive is LOCKED to allow the system to determine whether the password routine should be executed.

The WIPE DATA command, a new command, is honored only when the drive is in a LOCKED state, and aborts if the drive is UNLOCKED. When the WIPE DATA command is issued, the drive is set busy until all user data sectors have been written over. Upon completion, the drive resets to an UNLOCKED, password-disabled state and clears the busy signal. If the drive is interrupted during the WIPE DATA command, it remains in a LOCKED state. The WIPE DATA command allows the user to regain usage of the disk drive if the password is forgotten, although all data on the disk drive is lost.

The disk drive also honors the PASSWORD command, another new command, which performs different functions, depending on the contents of a precompensation register and whether the disk drive is LOCKED or UNLOCKED. One of two preferred values, such as AAh or 55h, must be in the precompensation register for the PASSWORD command to work. Otherwise, an aborted command message will be returned. If an AAh value is in the precompensation register and the drive is UNLOCKED when the PASSWORD command is asserted, the disk drive will receive the contents of the sector buffer, encrypt the contents of the second half of the buffer, and store the contents of both halves at two password locations on the hard drive. Thus new password values are written to the hard drive. If an AAh value is in the precompensation register and the drive is LOCKED, however, the drive unit will receive the contents of each half of the sector buffer and compare them to the passwords stored at the two locations on the hard disk, respectively. If the sector buffer contents match either of the passwords, the drive unit will be unlocked.

When the PASSWORD command is issued with a 55h value in the precompensation register and the drive is UNLOCKED, the set or change password capacity of the disk drive is disabled. When the set or change password capacity is disabled, the passwords stored at the two locations on the hard disk cannot be changed or removed. The set or change password capacity will remain disabled until the drive is power cycled. If the drive is LOCKED when the PASSWORD command is issued with a 55h value in the precompensation register, an aborted command will be returned. Therefore, the set or change password capacity can only be disabled when the disk drive is UNLOCKED.

In spite of the password security system on the drive, an unauthorized person might be able to bypass the password feature by exchanging the firmware associated with the microprocessor located on the drive. The simplest way to change the firmware would be to replace the printed circuit board on the drive with a circuit board that does not the employ password security code. A circuit board from another disk drive could also be used to access the data without using the password routine. To prevent this sort of access, the password protected drives incorporate a unique sector format so that circuit boards from prior model hard drives are not compatible. As a result, the unauthorized user would be denied access.

To enhance security, the two passwords may also be stored at two more locations elsewhere on the disk. In addition, the hard drive includes; another method for detecting a circuit board swap. When the user enters the user defined password, the password is stored on the magnetic media and in an EEPROM located on the drive as well. The next time the system is powered up, the password stored at the first location on the hard disk is compared to the password stored in the EEPROM. If the passwords match, the circuit board has not been replaced, and the system power up sequence proceeds. If the passwords do not match, however, the circuit board has been swapped. The password code then exits, and the drive remains LOCKED. The drive cannot be unlocked until the original circuit board is returned to the drive.

Figure 2:
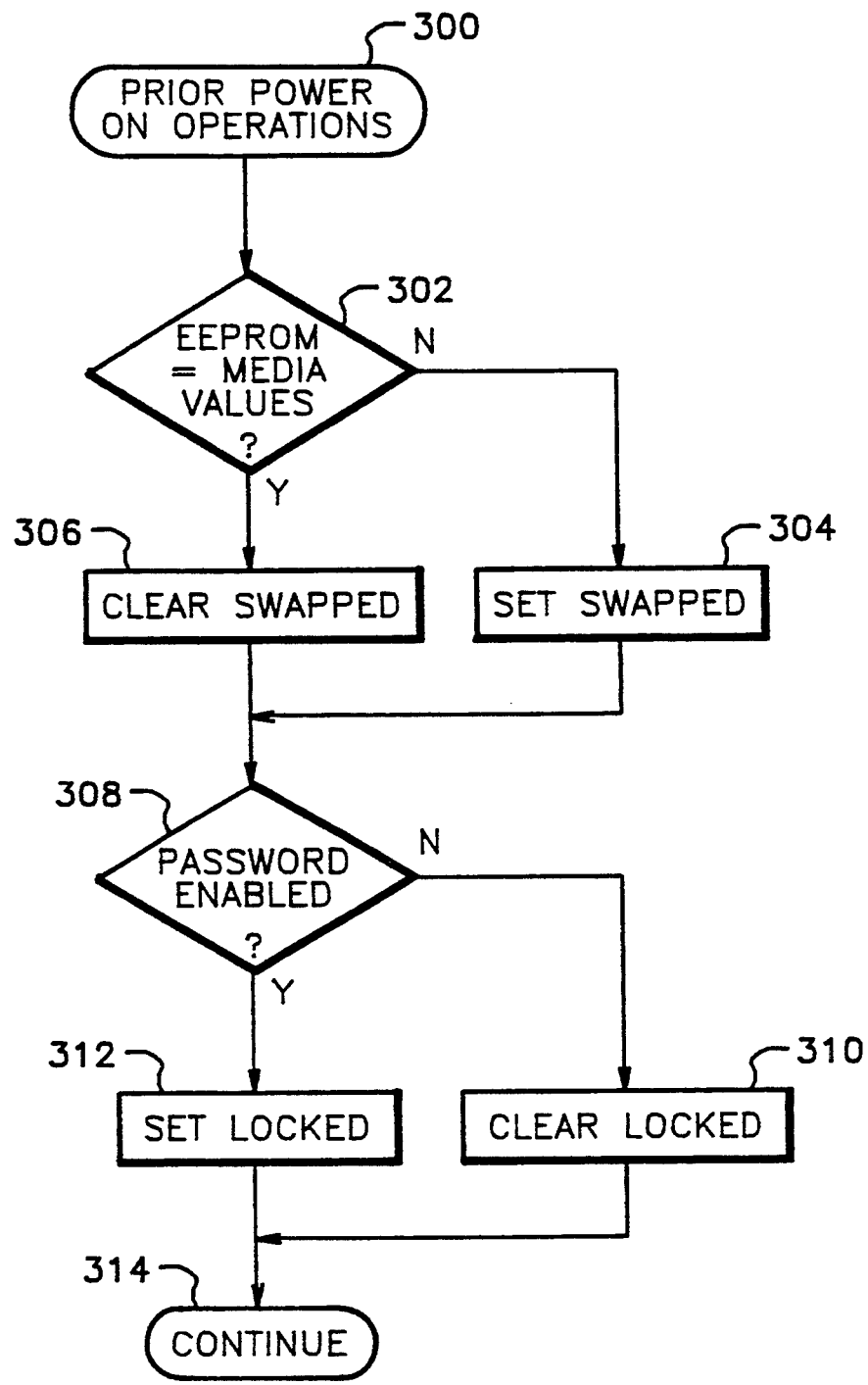
FIG. 2 is a flowchart illustration of a portion of the power on sequence of a hard drive according to the present invention.
Figure 3A:
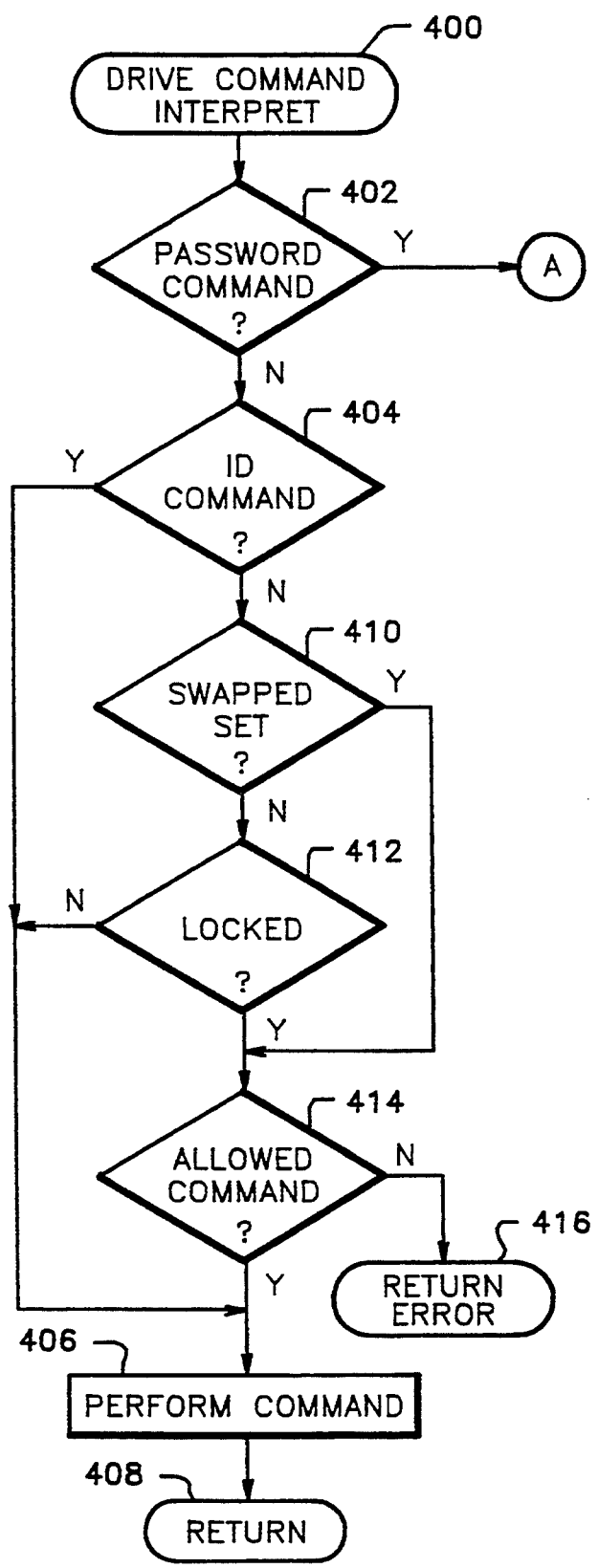
FIGS. 3A and 3B are flowcharts illustration of a portion of the command sequence of a hard drive according to the present invention.
Figure 3B:
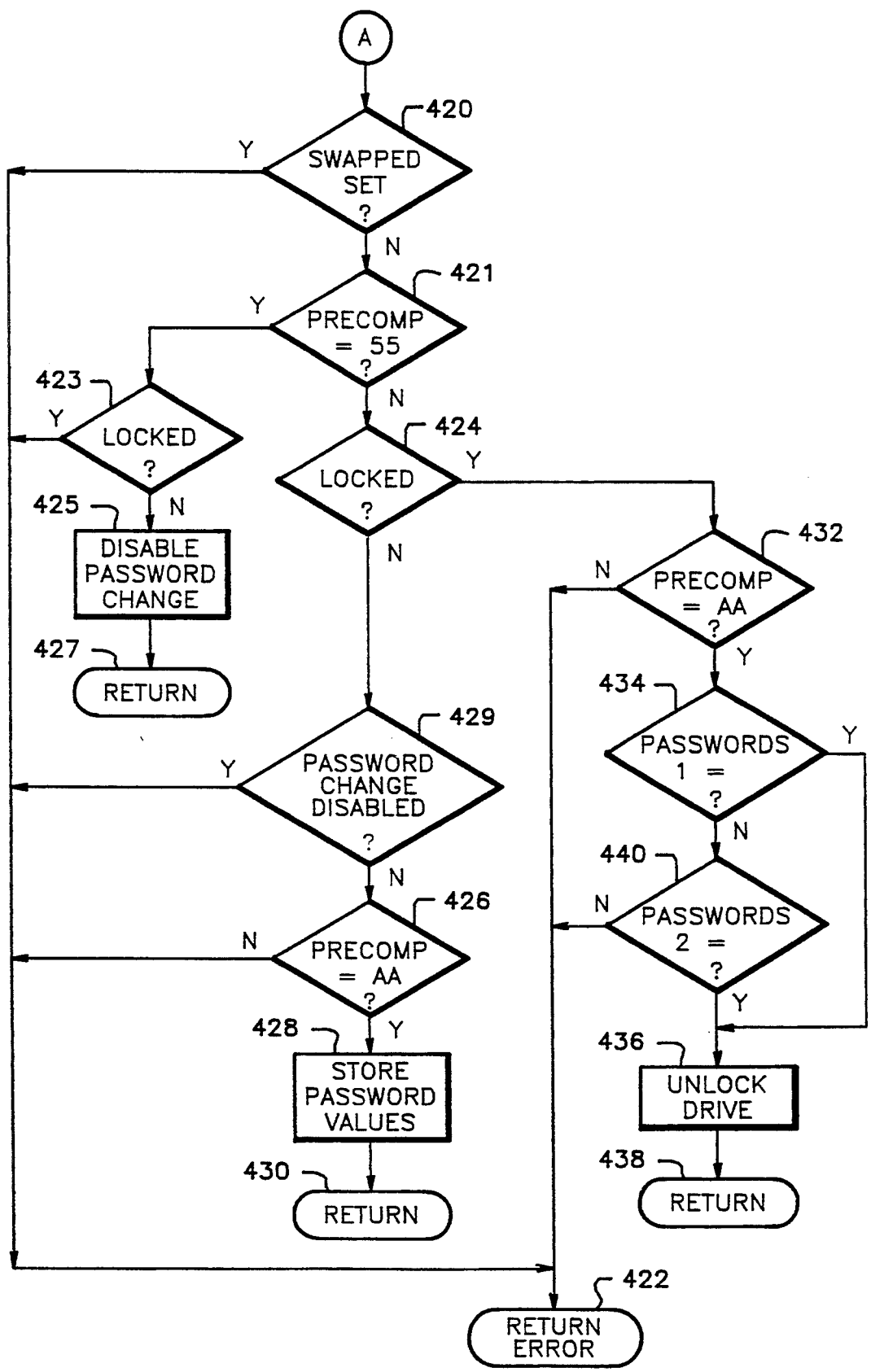

Operation of the drive as discussed above is shown in FIGS. 2, 3A and 3B. In step 300 the drive will have proven performing prior power-on operations. Control then proceeds to step 302 to determine if the password values contained in the EEPROM and on the magnetic media are equal. If not, this is an indication that the circuit board has been swapped and control proceeds to step 304 to set a swapped flag. If not, control proceeds to step 306 where the swapped flag is cleared. From steps 304 and 306 control proceeds to step 308 to determine if the password feature is enabled. If not, control proceeds to step 310 where the LOCKED bit is cleared. If it is enabled, control proceeds from step 308 to step 312 where the LOCKED bit is set. Control proceeds from step 310 or step 312 to the remaining operations in power-on.

Once the hard drive is in operation and power-on procedures have been completed, one of the functions of the drive is to scan for drive commands. When a command is received it proceeds to an interpreter sequence 400 shown in FIG. 3. The first step of sequence 402 determines if the password command has been received. If not, control proceeds to step 404 to determine if the ID command had been received. If so, control proceeds to step 406 and the ID command is performed. Control then proceeds to step 408 where the ID value is returned. If it is not an ID command, control proceeds from step 404 to step 410 to determine if the swapped flag is set. If not, control proceeds to step 412 to determine if the drive is LOCKED. If not, control proceeds to step 406 and the desired command is performed. If the drive is LOCKED as determined in step 412 or the board has been swapped as determined in step 410, control proceeds to step 414 to determine if the command is one of those allowed as indicated previously. If so, control proceeds to step 406 and the command is performed. If not, control proceeds to step 416 where an error value is set and control is returned.

If it was determined in step 402 that a password command had been received, control proceeds to step 420 to determine if the swapped flag has been set. If so, control proceeds to step 422 where an error flag is set and control is returned. If not, control proceeds to step 421 to determine if a 55h value is in the precompensation register. If so, control proceeds to step 423 to determine if the drive is LOCKED. If so, control proceeds to step 422. If not, control proceeds to step 425 where password changing is disabled. Control then returns in step 427.

If a value of 55h was not present in step 421, control proceeds to step 424 to determine if the drive is LOCKED. If not, control proceeds to step 429 to determine if password changing is disabled. If so, control proceeds to step 422. If not, control proceeds to step 426 to determine if an AAh value is located on the precompensation register. If not, control proceeds to step 422. If so, control proceeds to step 428 where the password values located in the sector buffer are stored, both to the magnetic media and to the EEPROM. Control then proceeds to step 430 which is a return.

If the drive was locked in step 424, control proceeds to step 432 to determine if the AAh value is located in the precompensation register. If not, control proceeds to step 422. If so, control proceeds to step 434 to determine if the user or first passwords are equal. If so, control proceeds to step 436 where the drive is unlocked and to step 438 where the command status is returned. If the passwords are not equal as determined in step 434, control proceeds to step 440 to determine if the manufacturer or second passwords are equal. If not, control proceeds to step 422. If so, control proceeds to step 436. Therefore the hard drive operates according to the conditions and parameters set forth above.

Figure 4:
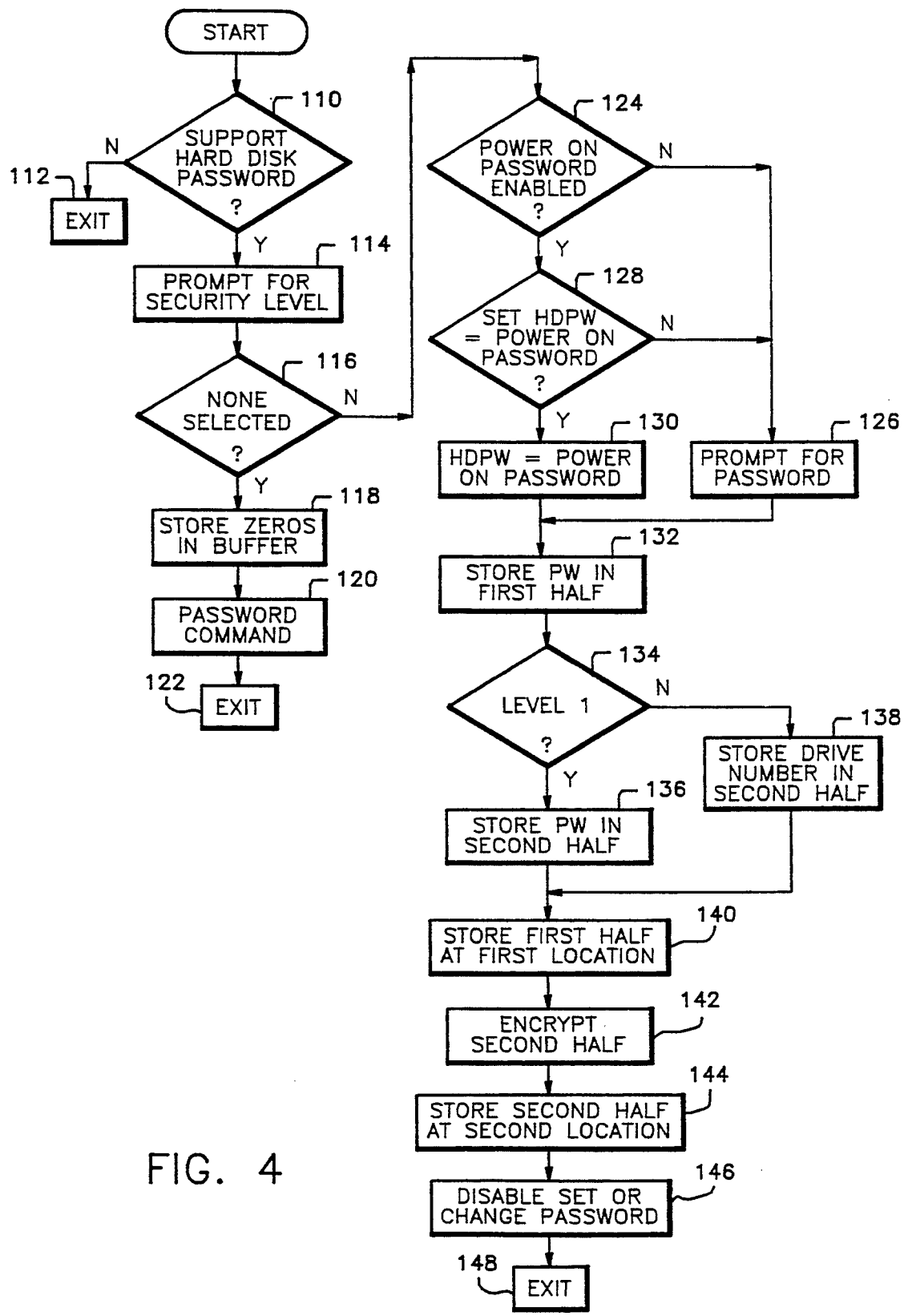
FIG. 4 is a flowchart illustration of operating sequences of the main processor for setting up the hard disk password feature according to the present invention.

A setup program initially sets and enables the hard disk password. The flow diagram shown in FIG. 4 depicts the enabling procedure for the hard disk password. Initially, the system determines at step 110 whether the drive supports the hard drive password security using the ID command as discussed below. If the drive does not support the hard drive password, the routine exits at step 112. If the unit supports the hard drive password, the user is prompted at step 114 to enter a desired level of security. After the user enters a choice, control proceeds to step 116, to determine whether the selected security level was NONE. If the NONE option was selected, control proceeds to step 118. Because the hard disk password is currently disabled, the drive unit is already UNLOCKED, the feature not being enabled by the manufacturer. Thus, the sector buffer is cleared, and control proceeds to step 120 where the PASSWORD command is issued and zeros are stored on the disk. When zeros are placed in the sector buffer and stored at the hard disk locations for the passwords, the hard disk password feature is disabled. In the disabled state, the drive is UNLOCKED and the set or change password capacity remains enabled. The routine then exits at step 122, and the hard disk remains UNLOCKED.

If LEVEL 1 or LEVEL 2 security is chosen in step 114, control proceeds from step 116 to step 124, where the system determines whether the power-on password is enabled. The power-on password feature protects the entire computer system from unauthorized access as discussed above. If the power-on password feature is disabled, control proceeds to step 126, where the user is prompted to enter a seven character, user defined password. If the power-on password feature is enabled, control proceeds to step 128, where the user is prompted to choose whether to set the hard disk password equal to the power-on password. Setting the hard disk password equal to the power-on password allows the user to enter only one password to gain access to the system following a cold boot, as described below, instead of entering both a power-on password and a hard disk password. If the user chooses to set the two passwords equal, control proceeds to step 130, where the hard disk password is set equal to the power-on password. If the user chooses to use a different password, control proceeds to step 126, and the user provides a personally chosen seven character password.

From steps 126 and 130, control proceeds to step 132, where the password determined in steps 126 and 130 is entered in the first half of the sector buffer. Control then proceeds to step 134 where a determination is made whether LEVEL 1 or LEVEL 2 security was chosen. If LEVEL 1 was chosen, control proceeds to step 136 and the password defined by the user in step 126 or 130 is stored in the second half of the sector buffer as well. If LEVEL 2 security was chosen, control proceeds to step 138 where certain characters of the drive serial number, such as the last seven non-blank or non-space digits, are placed in the second half of the sector buffer. The drive serial number is stored in the drive's memory, and is retrieved using the ID command. Control proceeds from step 136 and step 138 to step 140 and the PASSWORD command is issued. The drive looks for one sector of data containing two seven-byte password entries in the sector buffer. The first password entry is stored directly at a first location on the hard disk. The password is stored in a reserved location on the disk that is not accessible to users. Control then proceeds to step 142 and the second password entry is encrypted using circuitry located on the hard drive. The encryption is performed according to a proprietary algorithm known only to the manufacturer. Control then proceeds to step 144 and the encrypted second password entry is stored at a second non-user location on the hard disk. After the second password is stored by the hard drive, a completion signal is provided and operation of the system program proceeds to step 146 where a 55h value is stored in the precompensation register. In hard drives according to the preferred embodiment the precompensation register is used as a scratch pad register, the register remaining for compatibility reasons and the drive not needing externally provided precompensation values. The PASSWORD command is then issued and the set or change password capacity is disabled, preventing further alteration of the password. The routine then exits at step 148 and returns to the main setup program.

If the hard disk password was to be set or changed after the initial setting, the above program would be modified to determine if the hard drive was not swapped and was UNLOCKED before prompting for the security level. If not, the program would exit.

Figure 5:
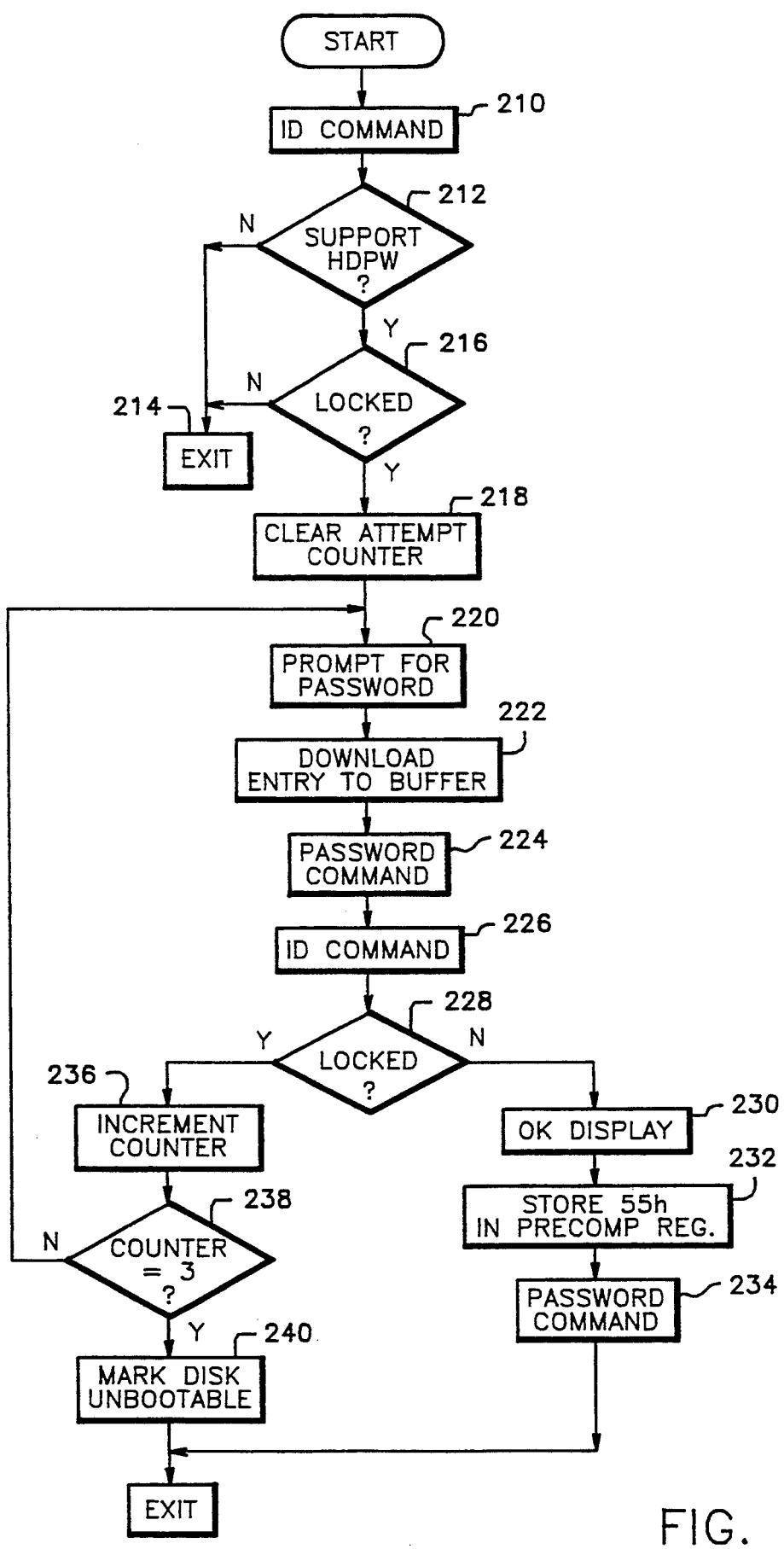
FIG. 5 is a flowchart illustration of the operating sequence of the main processor for the hard disk password security system according to the present invention.

The hard disk password code is executed each time the system is power cycled. After the system completes the POST operations, the power-on password code is executed if it is enabled. The hard disk password code, depicted by the flow diagram in FIG. 5, then begins. First, the ID command is issued in step 210, and the results are tested in step 212 to determine whether the drive supports the hard disk password option. If it does not support the option, the routine exits at step 214. If it does, the results are again tested in step 216 to determine whether the disk drive is currently LOCKED. If the drive is not LOCKED, the routine exits. If the drive is LOCKED, control proceeds to step 218, where an attempt counter, described in greater detail below, is cleared. Control then proceeds to step 220 which prompts the user to enter a password. The user then enters a password of up to seven characters. From step 220, control proceeds to step 222 and the password entered by the user is downloaded to each half of the sector buffer.

Because an AAh value is preferably stored in the precompensation register at the time the system is powered up, when the PASSWORD command is given at step 224, the drive expects to receive one sector of data containing two seven-byte password entries in the sector buffer. The hard drive controller compares the entry in the first half of the sector buffer with the password stored at the first location on the hard drive. If the password matches the entry, the hard drive controller unlocks the disk. If the password is incorrect, however, the entry in the second half of the sector buffer is compared to the encrypted password stored at the second location on the hard drive. If a match is found, the hard drive is UNLOCKED. If not, the drive remains LOCKED. At step 226, the processor issues the ID command and determines whether the password unlocked the drive at step 228. If the drive is unlocked, an OK symbol is displayed in step 230, a system internal drive status flag is set to the UNLOCKED state, and the system proceeds with all of the hard drive commands available. In step 232, a 55h value is stored in the precompensation register and the PASSWORD command is issued at step 234, thus disabling the set or change password capacity.

If the entry matches neither password, the drive remains LOCKED. Control proceeds from step 228 to step 236, where the attempt counter is incremented by 1. The attempt counter reflects how many times the user has tried to enter a valid password and failed. Control then proceeds to step 238 and it is determined whether the counter value equals 3. If the counter has not yet reached a value of 3, control returns to step 220 to prompt the user for a another attempt at the password. If the counter value has reached 3, a bad password prompt is displayed and the hard disk is marked as non-bootable at step 240, the set or change password capacity remains enabled, and the routine exits. After the disk is so marked, it remains inaccessible to the user until the system is power cycled and the user enters the correct password, or the WIPE DATA command is executed.

In an alternative embodiment:, the hard drive may also be unlocked using the power on password program, which runs immediately before the hard disk password code. When the user enters the password for access to the computer system, the password is first used as the power on password. Next, the password is directed to the hard drive and an attempt is made to unlock it using the power on password. If the passwords are not the same, the attempt to unlock the hard drive fails and has no other effect. If the passwords are the same, however, the hard drive is unlocked and the set or change password capacity will be disabled. The processor then finishes the power on password routine.

The computer system then executes the hard drive password routine. When the processor checks the status of the hard drive, the hard drive will be UNLOCKED. Therefore, the routine will exit and the password will not have to be entered a second time.

The hard disk password may preferably be changed or disabled in the hard drive password routine. When the user is prompted for the hard disk password, the user can change the password by typing the old password followed by an exemplary character, such as a forward slash (/), the new password followed by a forward slash (/), and the new password again. If the two new passwords are not identical, the password will not be changed and an error message is displayed. This ensures that the password entered is the one intended by the user. As described above, the user entry is stored in the sector buffer and the PASSWORD command executed. If the correct password was provided, the drive will be UNLOCKED when the ID command is given. Before the set or change password capacity of the drive is disabled, however, the new password is loaded into the sector buffer and the PASSWORD command is again asserted. Because the drive is now UNLOCKED, but an AAh value is still in the precompensation register, the contents of the sector buffer are stored on the disk as described above. The 55h value is then stored in the precompensation register and the PASSWORD command is asserted a third time, disabling the set or change password capacity of the drive.

To disable the hard disk password altogether, the user types the old password followed by two slashes. The sequence described above is executed, but with zeros stored in the sector buffer. At the end of the sequence, the PASSWORD command is not asserted with a 55h value in the precompensation register, and the set or change password capacity of the drive thus remains enabled.

In addition, the password can be changed or disabled using the power on password routine. As described above, when the user is prompted for the power on password, the user types the old password followed by a forward slash (/), the new password followed by a forward slash (/), and the new password again. When the password is changed or disabled, the computer system also attempts to unlock and change the hard drive password as described above using the power on password. If the two passwords are identical, the hard disk password is also changed or disabled to remain identical with the power on password. The new password is placed in the sector buffer and stored on the hard disk as described above. The hard drive is also UNLOCKED, and the set or change password capacity of the hard drive is disabled, preventing further alterations of the hard drive password until the system is power cycled.

To change levels of protection, the hard disk password feature must first be disabled by entering the password followed by two slashes. As described above, this unlocks the drive, stores zeros on the hard disk, and leaves the set or change password capacity enabled. The user must then run the setup program again and choose the desired level of security.

Similarly, if the power on password and the hard disk password are identical, the user can only change them to different passwords by first disabling both password features. Then the user can run the setup program and provide new passwords.

The foregoing disclosure and description of the invention are illustrative and explanatory thereof, and various changes in the size, shape, materials, components, circuit elements, wiring connections and contacts, as well as in the details of the operation and construction may be made without departing from the spirit of the invention.

What is claimed is:

1. A hard disk drive having LOCKED and UNLOCKED states for use in a computer system, the hard disk drive comprising:

means on the hard disk drive for storing user data and a password value for operating of the hard disk drive;

means on the hard disk drive for receiving a plurality of commands including at least one password value from the computer system;

means on the hard disk drive for locking access to the hard disk drive to all but selected ones of said received plurality of commands while in a LOCKED state, one of said selected commands being an UNLOCK command and another of said selected commands being a WIPE DATA command;

means on the hard disk drive for comparing a password value received from the computer system with a stored password value upon receipt of said UNLOCK command and unlocking the hard disk drive if the compared password values are equal;

means for coupling to a microprocessor and for providing a WIPE DATA command to the hard disk drive from the microprocessor: and means on the hard disk drive while in a LOCKED state for overwriting all user data on said hard disk drive and then reset said hard disk drive to its UNLOCKED state upon receipt of said WIPE DATA command.

2. The hard disk drive of claim 1, wherein said unlocking means unlocks the hard disk drive after completion of operation of said means for overwriting.

3. The hard disk drive of claim 1, wherein one of said plurality of commands which is not one of said selected commands is a change password command; and the hard disk drive further comprising:
means on the hard disk drive for changing said stored password value upon receipt of said change password command.

4. The hard disk drive of claim 3, wherein one of said plurality of commands which is not one of said selected commands is a disable password change command; and the hard disk drive further comprising:
means on the hard disk drive for disabling said means for changing said stored password value after receipt of said disable password change command.

5. The hard disk drive of claim 1, further comprising:
means for storing a second password value; and
wherein said means for comparing compares said received password value with said second stored password value and unlocks the hard disk drive if equal.

6. The hard disk drive of claim 1, wherein said hard disk drive includes a serial number and said second stored password is an encrypted portion of said serial number.

7. The hard disk drive of claim 1, further comprising:
means on the hard disk drive for setting the hard disk drive in a LOCKED state upon power on the hard disk drive.

8. The hard disk drive of claim 1, wherein none of said selected commands allow user data to be obtained from the hard disk drive.

9. A computer system comprising:
a microprocessor;
means coupled to said microprocessor for storing program steps;
means coupled to said microprocessor for receiving a password value from a user;
means coupled to said microprocessor and said user password value receiving means for providing an UNLOCK command with said user password value;
a hard disk drive coupled to said microprocessor and said user password value receiving means, said hard disk drive having LOCKED and UNLOCKED states and including:
means on the hard disk drive for storing user data and a password value for operation of said hard disk drive;
means on the hard disk drive for receiving a plurality of commands from said microprocessor;
means on the hard disk drive for locking access to said hard disk drive to all but selected of said plurality of commands while in a LOCKED state, one of said selected commands being said UNLOCK command and another of said selected commands being a WIPE DATA command;
means on the hard disk drive for comparing a received user password value with a stored password value upon receipt of said UNLOCK command and unlocking said hard disk drive if the compared password values are equal;
means coupled to said microprocessor for providing a WIPE DATA command to said hard disk drive via said microprocessor; and
means on said hard disk drive while in a LOCKED state for overwriting all user data on said hard disk drive and then reset said hard disk drive to its UNLOCKED state upon receipt of said WIPE DATA command.

10. The computer system of claim 9, wherein said WIPE DATA command means unlocks said hard disk drive after completion of said overwriting.

11. The computer system of claim 9, further comprising means coupled to said microprocessor and said user password value receiving means for providing a change password command and new password values to said hard disk drive via said microprocessor, said change password command being one of said plurality of commands which is not one of said hard disk drive selected commands; and
wherein said hard disk drive further includes:
means on said hard disk drive for changing said stored password value upon receipt of said change password command.

12. The complete system of claim 9, further comprising:
means coupled to said microprocessor for providing a disable password change command to said hard disk drive via said microprocessor; and wherein said hard disk drive further includes:
means on said hard disk drive for disabling said means the change said stored password value after receipt of said disable password change command.

13. The computer system of claim 9, wherein said hard disk drive further includes:
means on said hard disk drive for storing a second password value; and
wherein said means for comparing further said received password value with said second stored password value and unlocks said hard disk drive if the compared password values are equal.

14. The computer system of claim 9, wherein said hard disk drive includes a serial number and said second stored password is an encrypted portion of said serial number.

15. The computer system of claim 9, said hard disk drive further including:
   means on said hard disk drive for setting the hard disk drive in a LOCKED state upon power on the hard disk drive.

16. The computer system of claim 9, wherein none of said hard disk drive selected commands allow user data to be obtained from said hard disk drive.

17. The computer system of claim 9, further comprising:

means for storing a password value for operation of said computer system; and means coupled to said computer system password storing means and said user password value receiving means for comparing a received password value from said user password value receiving means with said stored computer system password value and disabling computer system operation until said stored password value is received.

18. The computer system of claim 17, wherein said computer system stored password value and said hard disk drive stored password value are identical.

* * * * *

UNITED STATES PATENT AND TRADEMARK OFFICE
CERTIFICATE OF CORRECTION

PATENT NO. : 5,375,243
DATED : December 20, 1994
INVENTOR(S) : James D. Parzych et al.

It is certified that error appears in the above-identified patent and that said Letters Patent is hereby corrected as shown below:

Column 11,
Line 52, after "comparing" delete "compares".
Line 56, delete "claim 1" and insert therefor -- claim 5 --.

Signed and Sealed this

Fifteenth Day of November, 2005

JON W. DUDAS
*Director of the United States Patent and Trademark Office*